(12) United States Patent
Froehlich et al.

(10) Patent No.: US 9,803,657 B2
(45) Date of Patent: Oct. 31, 2017

(54) HYDRAULIC ADJUSTING DEVICE (71) Applicant: Robert Bosch GmbH, Stuttgart (DE)

(72) Inventors: Udo Froehlich, Rothenfels (DE); Sebastian Krug, Lohr (DE); Ibrahim Doertoluk, Krombach (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 14/409,580

(22) PCT Filed: May 31, 2013

(86) PCT No.: PCT/EP2013/001605
§ 371 (c)(1),
(2) Date: Dec. 19, 2014

(87) PCT Pub. No.: WO2013/189566
PCT Pub. Date: Dec. 27, 2013

(65) Prior Publication Data
US 2015/0354604 A1 Dec. 10, 2015

(30) Foreign Application Priority Data
Jun. 20, 2012 (DE) .................. 10 2012 012 142

(51) Int. Cl.
*F16D 31/02* (2006.01)
*F15B 11/072* (2006.01)
(Continued)

(52) U.S. Cl.
CPC ............ *F15B 11/072* (2013.01); *F15B 1/022* (2013.01); *F15B 11/0725* (2013.01);
(Continued)

(58) Field of Classification Search
CPC .... F15B 1/022; F15B 11/0725; F15B 20/002; F15B 20/004
See application file for complete search history.

(56) References Cited

U.S. PATENT DOCUMENTS 1,812,587 A * 6/1931 Ellis ...................... F15B 13/021
60/475
9,239,064 B2 * 1/2016 Helbig .................... F15B 1/022

FOREIGN PATENT DOCUMENTS

DE          101 22 858 A1    11/2002
DE      10 2007 050 350 A1    4/2009
(Continued)

OTHER PUBLICATIONS

International Search Report corresponding to PCT Application No. PCT/EP2013/001605, mailed Aug. 20, 2013 (German and English language document) (8 pages).

*Primary Examiner* — Michael Leslie
(74) *Attorney, Agent, or Firm* — Maginot, Moore & Beck LLP (57) ABSTRACT

A hydraulic adjusting device, in particular for use in a power plant and/or a wind power plant, includes a double-acting adjusting cylinder that has an adjusting function for a working operation and for a special operation. The double-acting adjusting cylinder is configured to be pressurized with a working pressure medium. In order to satisfy the adjusting function in the special operation, the double-acting adjusting cylinder is further configured to be connected to a pressure medium reservoir that has a pressurized gas isolated from the working pressure medium. The adjusting cylinder has a working chamber configured for the adjusting function of the special operation, the piston area of which is coupled to a piston arrangement of the adjusting cylinder that is configured for the working operation or is configured to be coupled to the piston arrangement.

14 Claims, 3 Drawing Sheets

(51) Int. Cl.
    *F15B 15/14*     (2006.01)
    *F15B 15/20*     (2006.01)
    *F15B 1/02*     (2006.01)
    *F15B 20/00*     (2006.01)

(52) U.S. Cl.
    CPC .......... F15B 15/1423 (2013.01); F15B 15/20 (2013.01); F15B 20/002 (2013.01); F15B 20/004 (2013.01); *F15B 15/1409* (2013.01); *F15B 15/1466* (2013.01); *F15B 15/1476* (2013.01); *F15B 2211/212* (2013.01); *F15B 2211/7054* (2013.01); *F15B 2211/7055* (2013.01); *F15B 2211/8623* (2013.01); *F15B 2211/8752* (2013.01)

(56) References Cited

FOREIGN PATENT DOCUMENTS

| FR | 1 216 426 | 4/1960 |
| WO | 2012/076178 A1 | 6/2012 |

\* cited by examiner

HYDRAULIC ADJUSTING DEVICE

This application is a 35 U.S.C. §371 National Stage Application of PCT/EP2013/001605, filed on May 31, 2013, which claims the benefit of priority to Serial No. DE 10 2012 012 142.3, filed on Jun. 20, 2012 in Germany, the disclosures of which are incorporated herein by reference in their entirety.

BACKGROUND

The disclosure relates to a hydraulic adjusting device.

An adjusting device of this type has an adjusting cylinder with a piston or with a piston arrangement with two piston surfaces which are effective in opposite directions, wherein a first working space is delimited via a first of the piston surfaces and a second working space is delimited via a second of the piston surfaces. The adjusting cylinder which is thereby configured to be double-acting therefore has an adjusting direction and a resetting direction. In a working operation, the two working spaces are acted upon with an in particular incompressible or hydrostatic working pressure medium. An adjusting device of this type is used, for example, for adjusting a rotor blade of a wind energy installation or for adjusting a valve in a cooling circuit of a different energy installation.

In order to ensure an adjustment, for example, of the rotor blade even in a special operation, in particular in an emergency or emergency moving operation, the adjusting device additionally has a pressure medium accumulator which, for this purpose, is connectable to the adjusting cylinder. An adjusting device of this type is shown, for example, in the document DE 101 22 858 A1.

However, a disadvantage of the solution shown there is that the same working space is used both for carrying out the working function of the adjusting device and for carrying out the special function or emergency moving function. A pressure medium circuit for the working operation is therefore not separate from the pressure medium circuit of the special operation, and this can have a disadvantageous effect on fail-safety in the event of the special operation. A further disadvantage of the solution shown is that two separate cylinders are provided for carrying out the two functions, which constitutes a high outlay in terms of apparatus. Even if the spring accumulator shown in the solution is replaced by a gas-loaded hydraulic accumulator, the adjusting device shown also continues to have such a high overall weight that it is not very suitable in particular for use as an adjusting device for a wind energy installation in which a low weight is significant.

By contrast, the disclosure is based on the object of providing a hydraulic adjusting device which is simplified in terms of apparatus.

SUMMARY

This object is achieved by a hydraulic adjusting device having the features of the disclosure.

Advantageous developments of the hydraulic adjusting device are described in the sub claims.

A hydraulic adjusting device, in particular for use in a wind energy installation or an atomic energy installation or in another energy or process engineering installation, in particular with an adjusting function for a working operation and with an adjusting function for an in particular safety-relevant special operation, in particular for an emergency operation or emergency moving operation, has an adjusting cylinder which has a piston arrangement with two piston surfaces which are effective in opposite directions, and therefore the adjusting cylinder is configured to be double-acting via the two piston surfaces. The piston arrangement here can have one or more pistons. A first working space of the adjusting cylinder is delimited via a first of the two piston surfaces and a second working space of the adjusting cylinder is delimited via a second of the two piston surfaces. Said two working spaces can be acted upon, in particular in the working operation, with an in particular incompressible working pressure medium. Furthermore, the adjusting device has a pressure medium accumulator which is connectable to the adjusting cylinder and contains a pressurized gas which is separate from the working pressure medium. According to the disclosure, the adjusting cylinder has a third working space which is delimited via a third piston surface and is acted upon with the compressed gas. The third piston surface is coupled here to the piston arrangement or is couplable to the piston arrangement.

All of the working spaces necessary for the working operation and the special operation are therefore integrated in the adjusting cylinder of the adjusting device, as a result of which the adjusting device is of simpler and more compact configuration in terms of apparatus in comparison to the prior art. Via the piston arrangement, firstly an adjustment in the working operation and secondly an adjustment in the special operation or emergency operation are possible. The first two working spaces of the piston arrangement, which working spaces can be acted upon with working pressure medium, are preferably effective for the adjustment during the working operation. By contrast, the third working space, which can be acted upon with compressed gas, or the third piston surface thereof, which is coupled or is couplable to the piston arrangement, preferably acts on the piston arrangement for the adjustment in the special operation. Since the compressed gas is separate from the working pressure medium, the piston arrangement itself can therefore also be adjusted even in the event of a failure of the pressure medium supply of the working pressure medium, and this increases a fail-safety of the adjusting device with respect to the special operation and in particular the emergency operation. A separation of a compressible compressed gas from an incompressible working pressure medium, as has to take place, for example, via a diaphragm, a bottle or a piston in conventional gas-loaded hydraulic accumulators is omitted. Instead, said separation takes place within the adjusting cylinder via the movable third piston surface thereof. The compressed gas used in this manner permits a simple, in terms of apparatus, lightweight and also cost-effective use of a compressed gas cylinder as the pressure medium accumulator. As a result, the overall adjusting device can be of small, lightweight and favorable configuration. In a preferred use of the adjusting device for feathering or pitch adjustment of at least one rotor blade of a wind energy installation, this has the advantage that the adjusting device can be arranged predominantly, preferably completely, in the limited construction space of a rotor hub, and therefore rotary transmission leadthroughs, which are complicated in particular in terms of apparatus, for the working pressure medium and the compressed gas from a stationary nacelle toward the hub can be omitted. A plunger cylinder, which is of simple configuration in terms of apparatus, is preferably formed via the third working space and the third piston surface, which is displaceable axially therein. It is also possible for more than one element to be adjusted via the adjusting device. For example, it is possible to adjust a plurality of rotor blades or valves via a common adjusting device.

In a preferred development, the adjusting device is configured in such a manner that the third working space can be acted upon with the compressed gas as a function of a control signal or a measuring signal. The measuring signal preferably depicts a physical, thermal, chemical or other process or state variable, in particular a control current or the failure thereof. The control signal is preferably a signal for a transition from the working operation into the special operation. When the adjusting device is used for pitch adjustment of the rotor blade of a wind energy installation, the measuring signal preferably depicts a wind velocity or a structural loading of the rotor or of the nacelle or of the tower.

A preferred development of the adjusting device has a hydraulic machine having a first and having a second pressure medium connection, wherein the first working space is connectable to the first pressure medium connection in particular via a first pressure medium line, and the second working space is connectable to the second pressure medium connection in particular via a second pressure medium line. A line here should be understood as meaning a line in the literal sense or a pressure medium channel.

The adjusting device preferably has an electric motor which is coupled to the hydraulic machine. The hydraulic machine is driveable in a pumping operation via the electric motor or is brakeable in the motor operation thereof via said electric motor.

In order, during the special function, to be able to bypass the hydraulic machine during an adjustment of the adjusting cylinder, and therefore of the first and/or second piston surface thereof, the adjusting device has a bypass directional control valve which is designed in particular as a switching valve and has at least one blocking position, which is actuable in particular electromagnetically or with control pressure, and an in particular spring-prestressed basic flow position. The first working space is connectable here via the latter to the second working space, bypassing the hydraulic machine.

In order to control the connection of the pressure medium accumulator to the third working space, in a preferred development the adjusting device has a shutoff valve which is configured in particular as a valve seat and/or as a switching valve and has at least one blocking position, which is actuable in particular electromagnetically or with control pressure, and an in particular spring-prestressed basic flow position. The pressure medium accumulator, which contains the compressed gas provided for the special operation, is connectable here via said basic flow position to the third working space.

In a particularly preferred and advantageous development, the first and the second piston surface are approximately identical in size, and therefore the adjusting cylinder is configured as a synchronous cylinder with respect to the first and the second working space. This has the advantage that, during a movement of the first and/or second piston surface out of the first working space, the same amount of pressure medium is displaced as is supplied to the second working space, or vice versa. As a result, a pressure medium accumulator for trapping a differential volume, as occurs in the case of unequal piston surfaces, can be dispensed with.

An adjusting cylinder which is simple in terms of apparatus is preferably configured in such a manner that the first working space and the second working space are arranged in tandem in a longitudinal direction of the adjusting cylinder.

In a preferred development of the adjusting device, the first and the second piston surface of the piston arrangement are arranged facing away from each other, and therefore the central surface normals thereof substantially point away from each other. This has the advantage that the piston arrangement can be configured as a compact, cost-effective piston.

A solution, which is particularly simple in terms of apparatus, for coupling the third piston surface to the piston arrangement is provided if the third piston surface is formed on a piston rod of the piston arrangement.

The adjusting cylinder has a particularly simple construction if all three working spaces are arranged in tandem in the longitudinal direction of the adjusting cylinder and/or are delimited radially at least in sections via a common housing of the adjusting cylinder.

An adjusting cylinder which is of shorter size in the longitudinal direction for a given stroke is produced if one working space is arranged concentrically with respect to one of the other working spaces. The first working space is preferably arranged concentrically here with respect to the second working space. In this case, the adjusting cylinder is preferably designed as a concentric cylinder or as a coaxial cylinder.

In a preferred variant, in particular in the case of the concentric arrangement mentioned for the first and second working space, the first and the second piston surface of the piston arrangement are arranged facing each other such that the central surface normals thereof substantially point toward each other.

For the recharging of the pressure medium accumulator containing the compressed gas, in particular for the special operation or emergency moving operation, in a preferred development the adjusting device has a compressor function. In a first variant here, the compressor function is integrated in the adjusting cylinder. This is achieved by a compressor device being arranged in the adjusting cylinder. This variant proves particularly space-saving because of the pipework being omitted and the compact construction. In a second variant of this development, a compressor device is arranged outside the adjusting cylinder, as a result of which accessibility, in particular in the event of maintenance or exchange of the compressor device, is facilitated.

In order to execute the volume changing work, the variant with the compressor device arranged in the adjusting cylinder preferably has an auxiliary piston on which the third piston surface, which is couplable to the piston arrangement, is arranged. The auxiliary piston, or the third piston surface, can therefore either be coupled to the piston arrangement or decoupled therefrom, which permits a movement of the auxiliary piston independently of the piston arrangement. As a result, the pressure medium accumulator can be charged without a position of the piston arrangement changing.

In this variant—in particular for carrying out the compressor function for filling the pressure medium accumulator with compressed gas—a fourth piston surface which is effective in the opposite direction to the third piston surface is preferably arranged on the auxiliary piston, via which fourth piston surface a fourth working space of the adjusting cylinder is delimited, said fourth working space being connectable to one of the pressure medium connections of the hydraulic machine or to a hydraulic accumulator containing the working pressure medium.

For the same reason, the adjusting device preferably has at least one directional control valve, in particular a switching directional control valve, with an in particular spring-prestressed basic position and with a switching position which is actuable in particular electromagnetically or with control pressure, wherein the fourth working space is connectable to the hydraulic accumulator via the basic position of said directional control valve and said directional control valve is connectable via the actuable switching position to one of the pressure medium connections of the hydraulic machine. If the compressor function is not, as previously described, integrated in the adjusting cylinder, the adjusting device preferably has a compressor which is external with respect to the adjusting cylinder.

In order to reduce the probability of failure of the special operation or emergency moving operation, a preferred development of the adjusting device has one or more further pressure medium accumulators filled with the compressed gas. Said additional pressure medium accumulator(s) is or are preferably chargeable manually and/or independently of an energy or power supply. For this purpose, the adjusting device preferably has an independent pressure medium accumulator charging device, in particular a compressor device.

The hydraulic machine is preferably configured in such a manner that it is operable as a hydraulic pump and as a hydraulic motor both in right-handed rotation and in left-handed rotation, that is to say, in four quadrants.

Preferably, at least one of the valves, particularly preferably all of the valves, is or are arranged in a control block of the adjusting device.

Said control block is particularly preferably arranged close to the adjusting cylinder or is connected to the latter, in particular releasably.

BRIEF DESCRIPTION OF THE DRAWINGS

Three exemplary embodiments of a hydraulic adjusting device according to the disclosure are explained in more detail below with reference to three circuit diagrams. In the figures.

DETAILED DESCRIPTION

Figure 1:
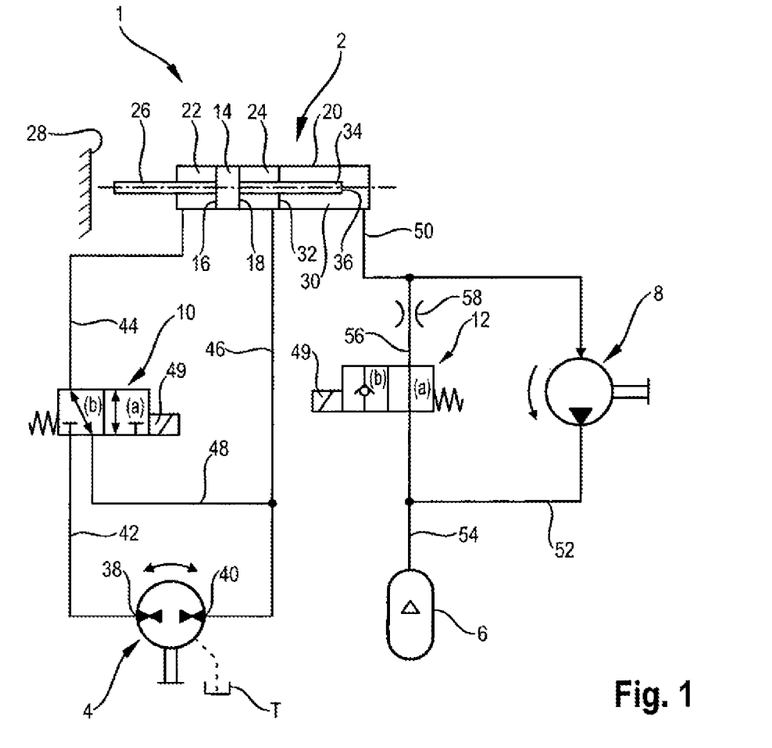
FIG. 1 shows a circuit diagram of a first exemplary embodiment of a hydraulic adjusting device with two alternative adjusting cylinders.

FIG. 1 shows a first exemplary embodiment of a hydraulic adjusting device 1 as is used in a wind energy installation for feathering or for adjusting a pitch of a rotor blade (not illustrated). The adjusting device 1 has an adjusting cylinder 2, a hydraulic machine 4 and a pressure medium accumulator 6. Furthermore, it has a compressor 8, a 3/2-port directional control valve 10 designed as a switching valve and a 2/2-port directional control valve 12 designed as a switching valve of valve seat construction.

The adjusting cylinder 2 has a piston 14 on which a first piston surface 16 is arranged on the left in FIG. 1 and a second piston surface 18 is arranged on the right. The piston surface 18 serves for moving the piston 14 in an adjusting direction and the piston surface 16 serves for moving same in a resetting direction. A first working space 22 is delimited via a housing 20 of the adjusting cylinder 2 and the first piston surface 16 and a second working space 24 of the adjusting cylinder 2 is delimited via the housing 20 and the second piston surface 18. Said adjusting cylinder has two piston rods, of which one piston rod 26, on the left in FIG. 1, penetrates the housing for the articulation of the rotor blade. A movement of the piston rod 26 to the left in FIG. 1 is limited via a stop 28. If the piston rod 26 is extended as far as the stop 28, this corresponds to a neutral or feathered position of the rotor blade, in which said rotor blade transmits only little torque, if any at all, to a rotor shaft of the wind energy installation.

The adjusting cylinder 2 has a third working space 30 which is separated off from the second working space 24 via a cylinder base 32. Starting from the piston 14, a second piston rod 34 penetrates the cylinder base 32 and projects into the third working space 30. A third piston surface 36 which, together with the housing 20 and the cylinder base 32, delimits the third working space 30 is coupled to the second piston rod 34, or is formed on the end side thereof.

The hydraulic machine 4 which is coupled to an electric motor (not illustrated) has a first pressure medium connection 38 and a second pressure medium connection 40. The hydraulic machine can be operated for pumping operation and motor operation and in left-handed rotation and right-handed rotation. It has a leakage connection which is connected to a tank T via a tank line. The first pressure medium connection 38 is connected to the first working space 22 via a pressure line 42 and 44 and the second pressure medium connection 40 is connected to the second working space 24 via a pressure line 46. In order to form a working pressure medium circuit via first working space 22, the pressure medium lines 44, 42, the first pressure medium connection 38, the hydraulic machine 4, the second pressure medium connection 40, the pressure medium line and the second working space 24, the 3/2-port directional control valve 10 has a switching position (a) which is actuable via a solenoid 49. In addition, the 3/2-port directional control valve 10 has a bypass position (b) for bypassing the hydraulic machine 4. In the bypass position (b), the pressure line 44 is connected to the pressure line 46 via a bypass line 48, bypassing the hydraulic machine 4. Via such a switching operation, pressure medium can flow out of the working spaces 22, 24 into the respectively other working space 24, 22 without having to overcome the resistance of the hydraulic machine 4. This is important in particular in a special operation or emergency moving operation, as is explained later.

The third working space 30 is connected to a suction connection of the compressor 8 via a pressure line 50. A pressure line 52 is connected to a high-pressure connection of the compressor 8. Said pressure line leads into a pressure line 54 which is connected to the pressure medium accumulator 6. A pressure line 56 branches off from the pressure line 50, which connects the third working space 30 to the suction connection of the compressor 8. An electromagnetically actuable 2/2-port directional control valve designed as a switching valve of seat valve construction is arranged between the pressure lines 54 and 56. Said 2/2-port directional control valve has a spring-prestressed flow position (a) and an electromagnetically actuable blocking position (b).

In a normal or working operation of the adjusting device 1, in order to articulate the rotor blade, the piston 14 and the piston rod 26 thereof have to be moved in the adjusting direction thereof, which is directed to the left, and in the resetting direction thereof, which is directed to the right, with the aid of the hydraulic machine 4. For this purpose, the bypass directional control valve 10 and the 2/2-port directional control valve 12 are energized, wherein the former is switched into the working position (a) thereof and the latter into the blocking position (b) thereof. The compressor 8 is not in use for this operating state. The pressure medium accumulator 6 contains compressed gas which is kept under a sufficiently high pressure of approximately 160 bar in order, for a special operation or emergency moving operation which occurs, to adjust the piston rod 26 as far as the stop 28 thereof. For movement of the piston rod 26 to the left in FIG. 1, the hydraulic machine 4 conveys pressure medium from the working space 22 via the pressure lines 44, 42 and 46 into the second working space 24. For a resetting of the piston 14 from the left to the right in FIG. 1, the pressure medium is conveyed in the reverse direction via the hydraulic machine 4.

Let it be assumed that the rotor blade (not illustrated) has to be adjusted into the force-free feathering position thereof. This takes place, for example, for the purpose of maintaining the wind power installation or in an emergency. For this purpose, the piston 14 or the piston rod 26 thereof has to move up to the stop 28 thereof. In all of the exemplary embodiments shown, this task can indeed be taken on both by the working circuit of the hydraulic machine 4 and by the pressure medium accumulator 6 in interaction with the third working space 30. In particular, however, if the power supply or control current supply fails or the working pressure medium circuit breaks down, the pressure medium accumulator 6 in interaction with the third working space 30, constitutes a redundant pressure medium circuit via which the feathering position is independently approachable and maintainable.

In order to explain this redundancy, let it be assumed that an emergency moving operation which is triggered by a failure of the control current supply is present. In this case, the bypass valve 10 and the 2/2-port directional control valve 12 are in unenergized. The bypass valve 10 therefore takes up the spring-prestressed bypass position (b) thereof and the 2/2-port directional control valve takes up the spring-prestressed flow position (a) thereof. By means of the position first mentioned, the pressure medium can circulate from the working space 22 into the working space 24, bypassing the hydraulic machine 4. Via the flow position (a) of the 2/2-port directional control valve 12, the pressure medium accumulator 6 is connected to the third working space 30 via the pressure line 54, 56 and 50. At this moment, the pressure in the pressure medium accumulator 6 acts on the third piston surface 36 such that a force which is directed to the left in FIG. 1 onto the stop 28 acts on the piston rod 34. The piston 14 is consequently displaced in this direction. In the process, said piston displaces pressure medium in the previously described manner out of the first working space 22 into the second working space 24 via the bypass valve 10. The rotor blade (not illustrated) is thereby moved in the direction of the feathering position thereof. The movement speed of the piston 14 during the emergency moving operation is restricted via a throttle 58 which is arranged in the pressure line 56 downstream of the 2/2-port directional control valve 12.

For regular resumption of the normal or working operation, it is a prerequisite below that the pressure medium accumulator 6 is charged for a potential emergency moving operation. For this purpose, the compressor 8 is provided. The task thereof is to convey the compressed gas, which is arranged in the third working space 30 after the previously described emergency moving operation, into the pressure medium accumulator 6 again. The prerequisite for this is that the adjusting device 1 again has a control current. Via a control unit (not illustrated), in order to recharge the pressure medium accumulator 6 the 2/2-port directional control valve 12, also referred to as the emergency moving switching valve, is switched into the blocking position (b) thereof such that compressed gas cannot flow back out of the pressure medium accumulator 6 into the third working space 30 during the charging operation. The compressor 8 is designed, for example, as a gas compressor or as a cylinder unit and in the following sucks up compressed gas out of the third working space 30 and charges the pressure medium accumulator 6 to the required emergency moving pressure of approximately 160 bar.

Alternatively to the described charging of the pressure medium accumulator 6 via the compressor 8, said charging can take place via the hydraulic machine 4. For this purpose, the solenoid 49 of the bypass valve 10 is energized such that said bypass valve takes up the flow position (a) thereof and the bypass line 48 is shut off. In order to charge the pressure medium accumulator 6, the hydraulic machine 4 then conveys pressure medium from the second working space 24 via the pressure lines 46, 42 and 44 into the first working space 22. As a result, the piston 14 is displaced out of the stop position thereof in the housing 20 to the right in FIG. 1 such that the third piston surface 36 in the third working space 30 is also displaced to the right. As a consequence, the gas in the third working space 30 is compressed and pressed via the flow position (a) of the emergency moving switching valve 12 into the pressure medium accumulator 6. In this alternative, the compressor 8 can be omitted as charging device. Alternatively or in addition, the bypass valve 10 can have a third switching position via which the piston 14 is lockable in a desired position.

The adjusting cylinder 2 of the preceding description of the figures is designed as a double-acting synchronous cylinder which is simple in terms of apparatus, wherein the synchronous feature is produced from the two piston surfaces 16 and 18 which are identical in size. In this construction, the working spaces 22, 24 and 30 are arranged in tandem along a longitudinal axis of the adjusting cylinder 2. The adjusting cylinder 2 therefore has a comparatively long size.

The adjusting cylinder 2' which is depicted at the top on the right in FIG. 1 shows an alternative constructional form of a double-acting synchronous cylinder. The adjusting cylinder 2' has a cylindrical housing 20' which is closed on both sides in the axial direction via a housing cover 60 and a cylinder base 62. Furthermore, the adjusting cylinder 2' has a first working space 22', a second working space 24' and a third working space 30'. A pin 64 which projects concentrically into the third working space 30' and has a radially expanded end section 66 on the left in FIG. 1 is arranged on the cylinder base 62. A hollow piston 14' has a central cylindrical recess 68 via which said hollow cylinder is mounted in an axially displaceable manner on the cylindrical radial expanded portion 66 of the pin 64. In addition, on an end section on the right in FIG. 1, the piston 14' has a radial collar 70, via the outer circumferential surface of which the hollow piston 14' is mounted in an axially displaceable manner on an inner lateral surface 72 of the cylinder housing 20'.

A first piston surface 16' acting in the resetting direction, a second piston surface 18' acting in the adjusting direction and a third piston surface 36' likewise acting in the adjusting direction are thereby formed on the hollow piston 14'. The working space 22' is delimited via the first piston surface 16', an inner end surface, which faces the latter, of the housing cover 60, the inner lateral surface 72 and an outer lateral surface of the hollow piston 14'. The second working space 24' is delimited via the second piston surface 18', an inner lateral surface of the cylindrical recess 68 of the hollow piston 14' and the end surface of the radial expanded portion 66 of the pin 64. The third working space 30' is delimited via the third piston surface 36', an end surface, facing the latter, of the cylinder base 62, the inner lateral surface 72, the outer lateral surface of the pin 64 and an annular end surface which is arranged on the radial expanded portion 66 on the right in FIG. 1.

The first working space 22' is suppliable with pressure medium via the hydraulic machine 4 and the pressure line 44. The pressure line 44 reaches here in the form of a pressure channel through the housing cover 60. The second working space 24' is suppliable with pressure medium via the hydraulic machine 4 and the pressure line 46. After entry into the cylinder base 62, the pressure line 46 here merges into a coaxial passage bore in the pin 64, which passage bore leads, on the left in FIG. 1, into the second working space 24'. The third working space 30' is suppliable with compressed gas from the pressure medium accumulator 6 via the pressure line 50, which reaches through the cylindrical housing part of the housing 20'.

The functioning of the normal operation and of the special operation or emergency moving operation applies analogously to the alternative adjusting cylinder 2' according to the preceding description of the adjusting cylinder 2. Parts of the adjusting cylinder 2' which act identically with respect to the adjusting cylinder 2 are provided here with the same reference numbers but expanded by a prime. The alternative adjusting cylinder 2' to the adjusting cylinder 2 is of a shorter size in the longitudinal direction because of the concentric, coaxial construction thereof.

A detailed description of a second exemplary embodiment of an adjusting device 101 with an accumulator charging mechanism, which is independent of the adjusting cylinder 2; 2', and cylinder locking follows. The adjusting device 101 corresponds in large parts to that according to the first exemplary embodiment of FIG. 1. For components which have remained the same, the reference numbers according to FIG. 1 have therefore also been adopted. Analogously to FIG. 1, the alternative adjusting cylinder 2', which is also unchanged, is depicted at the top on the right in FIG. 2. With reference to the first exemplary embodiment, the stop 28, the adjusting cylinder 2, the pressure lines 44, 46 supplying the adjusting cylinder 2; 2' with pressure medium, the pressure line 50 for supplying the third working space 30; 30', the throttle 58, the 2/2-port directional control valve 12, the pressure lines 52, 54, the pressure medium accumulator 6, the hydraulic machine 4 with the pressure medium connections 38, 40 thereof and the bypass line 48 are furthermore unchanged. In a departure from the first exemplary embodiment according to FIG. 1, a 2/2-port directional control valve 174 which is designed as a switching valve of seat valve construction and has an electromagnetically actuable flow position (a) and a spring-prestressed blocking position (b) is arranged in a pressure medium flow path from the first pressure medium connection 38 toward the first working space 22; 22'. Furthermore, a directional control valve 175 which is constructed identically to the directional control valve 174 and has the electromagnetically actuable flow position (a) and the spring-prestressed blocking position (b) is arranged in a pressure medium flow path from the second pressure medium connection 40 toward the second working space 24; 24'. The directional control valve 174 is connected here to the first working space 22; 22' via the pressure line 44, and the directional control valve 175 is connected to the second working space 24; 24', via the pressure line 46. The pressure lines 44, 46 are connectable via the bypass line 48 and a directional control valve 177 which is arranged therein and is of substantially identical construction to the directional control valves 174, 175. The directional control valve 177 differs from the directional control valves 174, 175 by the fact that the flow position (b) thereof is spring-prestressed and the blocking position (a) thereof is actuable electromagnetically via the solenoid 49.

Figure 2:
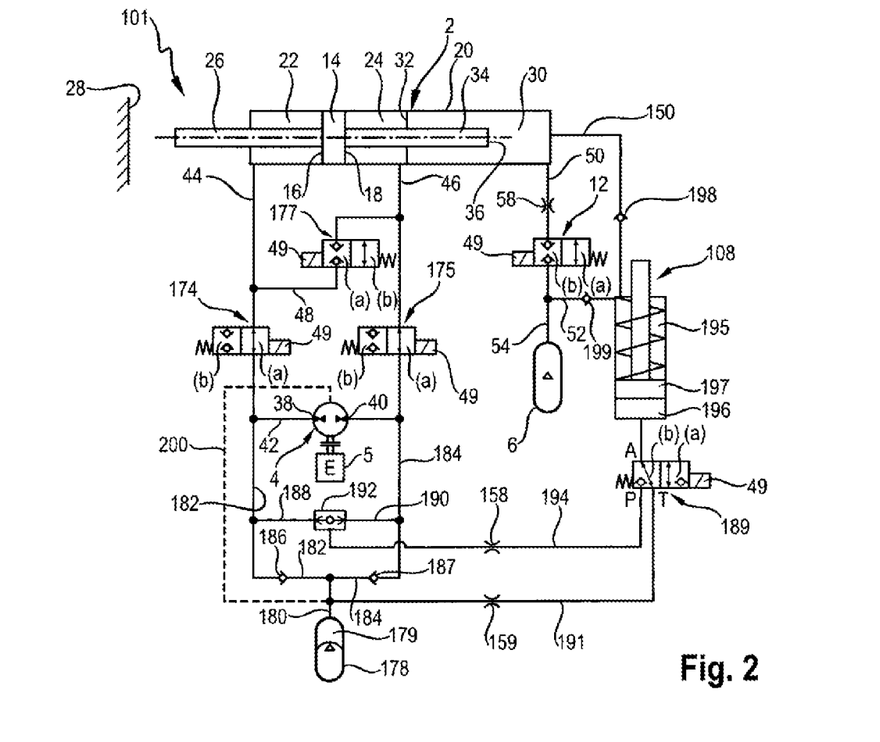
FIG. 2 shows a circuit diagram of a second exemplary embodiment of a hydraulic adjusting device with the two alternative adjusting cylinders.

Furthermore, the adjusting device 101 has a gas-loaded low pressure accumulator 178. A pressure medium line 180 is connected to the pressure medium space 179 of said low pressure accumulator, in which pressure medium space incompressible working pressure medium is arranged. Pressure lines 182, 184 branch off from the pressure medium line 180. The pressure line 182 is connectable via the pressure line 42 to the first pressure medium connection 38 of the hydraulic machine 4, wherein, in the pressure medium flow path from the low pressure accumulator 178 toward the pressure medium connection 38, a nonreturn valve 186 opening in this direction is arranged. In an analogous manner, the pressure line 184 is connectable to the second pressure medium connection 40 of the hydraulic machine 4, wherein, in the pressure medium flow path from the low pressure accumulator 178 toward the second pressure medium connection 40, a nonreturn valve 187 opening in this direction is arranged. In a respective section between the nonreturn valves 186, 187 and the pressure medium connections 38, 40, pressure lines 188, 190, which are connected to in each case one pressure medium input of a shuttle valve 192, branch off from the pressure lines 182, 184. The shuttle valve 192 selects a higher of the pressures acting in the pressure lines 182, 184 and communicates or transmits said pressure to a pressure line 194 which is explained later on.

In comparison to the first exemplary embodiment according to FIG. 1, the accumulator charging unit for charging the pressure medium accumulator 6 is explained in more detail in FIG. 2. The accumulator charging unit comprises a compressor 108 which is designed as a cylinder unit and has a spring-relieved gas space 195 and a pressure medium space 196. The gas space 195 is separated here from the pressure medium space 196 via a piston 197. The gas space 195 of the compressor 108 is connected to the third working space 30; 30' of the adjusting cylinder 2; 2' via a suction line 150. In the case of an adjusting cylinder 2', the cylinder base 62 is passed through by the suction line 150 or the suction channel which leads into the third working space 30'. A nonreturn valve 198 which opens toward the gas space 195 is arranged in the suction line 150. Furthermore, the gas space 195 of the compressor 108 is connected via the pressure line 52 to the pressure line 54 of the pressure medium accumulator 6. A nonreturn valve 199 which opens in the direction of the pressure medium accumulator 6 is arranged in the pressure line 52.

The pressure medium space 196 of the compressor 108 is connectable via a 3/2-port directional control valve 189, which is designed as a switching valve of seat valve construction, and the pressure line 194 to the output of the shuttle valve 192 and in this manner to the working pressure medium circuit of the hydraulic machine 4. A throttle 158 is arranged in the pressure line 194. Furthermore, a leakage connection of the hydraulic machine 4 is connected via a leakage line 200 to the pressure medium line 180. The latter is connected in turn via a pressure medium line 191 to a tank connection of the directional control valve 189. A throttle 159 is arranged in the pressure medium line 191.

In a working operation of the adjusting device 101 according to FIG. 2, the valves 12, 175, 177 and 174 are energized. The valve 12 therefore has the blocking position (b), the valve 175 has the flow position (a), the bypass valve 177 has the blocking position (a) and the valve 174 has the flow position (a). In this state, the first working space 22; 22' is in pressure medium connection with the second pressure space 24; 24' via the pressure line 44, the flow position (a) of the valve 174, the pressure line 42, via the hydraulic machine 4, the second pressure medium output 40, the flow position (a) of the valve 175 and the pressure line 46. In this state, the bypass line 48 is blocked by the blocking position (a) of the valve 177. The pressure medium space 179 is filled with incompressible pressure medium, in particular hydraulic oil, and is gas-loaded at a low pressure of approximately 3 bar. The gas loading takes place via the pressurized gas in the low pressure accumulator 178, which is separated in a leakage-free manner from the pressure medium space 179 via a diaphragm.

The hydraulic machine 4 is driven by the electric motor 5 and, for the movement of the piston 14; 14', conveys pressure medium into the second working space 24; 24'.

The piston 14; 14' thereby moves to the left in FIG. 2 in the direction of the stop 28. The pressure medium flowing here out of the first working space 22; 22' is supplied via the flow position (a) of the valve 174 to the first pressure medium connection 38 or to the suction side of the hydraulic machine 4. The quantity of pressure medium flowing off from the first working space 22; 22' and the quantity of pressure medium flowing to the second working space 24; 24' are approximately identical in size, since the piston surfaces 16; 16' and 18; 18' are approximately identical in size.

If the piston 14; 14' of the cylinder 2; 2' is to be retracted, the direction of movement of the hydraulic machine 4 is simply reversed. In this case, for the adjusting cylinder 2, the piston rod 34 moves into the third working space 30 such that a volume of the working space 30 is reduced and the pressure prevailing therein rises. An increase in pressure in the working space 30 here is approximately 0.2 to 1 bar. In the alternative adjusting cylinder 2', the same operation brings about the displacement of the piston 14' from the left to the right, and therefore the radial collar 70 reduces the volume of the third working space 30'. Even when the piston 14; 14' is maximally retracted, the increase in pressure in the third working space 30; 30' does not suffice to open the nonreturn valve 198 toward the gas space 195 of the compressor 108 or to open the nonreturn valve of the directional control valve 12, which nonreturn valve forms the blocking position (b), toward the pressure medium accumulator 6. The third working space 30; 30' therefore remains closed.

The emergency moving operation which has already been outlined in the first exemplary embodiment according to FIG. 1 is now explained for the exemplary embodiment of FIG. 2. The emergency moving operation is provided by the fact that the control current supply of the adjusting device 101 has completely failed. In this state, all of the solenoids 49 of the actuable valves 12, 175, 177, 174 and 189 are currentless, and therefore the latter are switched into the spring-prestressed switching positions thereof. Furthermore, there is a failure of the electric motor 5, and therefore the hydraulic machine 4 cannot provide any conveying power. The adjusting device 101 is configured in such a manner that, solely because of the lack of control current and the spring-prestressed basic positions of the valves, the third working space 30; 30' is acted upon via the flow position (a) of the directional control valve 12 with the pressure of the compressed gas that prevails in the pressure medium accumulator 6. The pressure medium accumulator 6 is therefore at least partially discharged via the directional control valve 12 into the third working space 30; 30' and from there via the pressure line 150 and the nonreturn valve 198 into the gas space 195 of the compressor 108. In the process, the pressure in the working space 30; 30' moves the piston 14; 14' in an extending manner in the direction of the stop 28. The working pressure medium flowing in the process out of the diminishing first working space 22; 22' flows via the pressure line 44, the bypass line 48, the flow position (b) of the valve 177 and the pressure line 46 to the enlarging second working space 24; 24'. If the stop 28 and therefore the feathered position of the rotor blade are reached, the piston 14; 14' is held in this position by the gas pressure of approximately 160 bar prevailing in the third working space 30; 30'. The pressure medium accumulator 6, the third working space 30; 30' and the gas space 195 then have approximately the same pressure value of approximately 160 bar.

In order to recharge the pressure medium accumulator 6 with compressed gas following the previously described emergency moving and therefore to provide renewed emergency moving, let it be assumed that the adjusting device 101 according to FIG. 2 again has a power supply. A prerequisite for the pressure medium accumulator 6 being able to be charged is that the valves 174, 175 are switched currentlessly and have the spring-prestressed blocking positions (b) thereof. This ensures that, when the hydraulic machine 4 is actuated, neither the first working space 22; 22' nor the second working space 24; 24' are supplied with pressure medium, and the piston 14; 14' is thereby locked. In addition, the bypass valve 177 is energized and likewise has the blocking position (a) thereof, and therefore a bypass volume flow between the working spaces 22, 24 or 22', 24' is prevented and the piston 14; 14' is clamped. At this moment, the piston 14; 14', or the piston rod thereof, is extended as far as the stop 28. The directional control valve 189 is energized via the solenoid 49 thereof and thus connects the pressure medium space 196 of the compressor 108 to the pressure line 194 and to the output of the shuttle valve 192. Furthermore, the directional control valve 12 is switched in an energized manner into the switching position (b) thereof, as a result of which the third working space 30; 30' is shut off from the pressure medium accumulator 6 via the nonreturn valve function of the directional control valve 12. As already explained, the pressure medium accumulator 6, the third working space 30; 30' and the gas space 195 of the compressor 108 have approximately the same pressure level of approx. 160 bar.

For the charging of the pressure medium accumulator 6 with compressed gas, the electric motor 5 drives the hydraulic machine 4 in any direction of revolution. In the process, the pressure medium is conveyed by the hydraulic machine 4, for example by the second pressure medium connection 40 via the pressure lines 184, 190, the shuttle valve 192, the throttle 158, the pressure line 194 and the switching position (a) of the directional control valve 189 into the pressure medium space 196 of the compressor 108. At the same time, pressure medium flows out of the pressure medium space 179 of the low pressure accumulator 178 via the nonreturn valve 186 toward the suction side, or toward the first pressure medium connection 38, of the hydraulic machine 4. The pressure medium flowing into the pressure medium space 196 brings about an extension of the piston 197, wherein gas flows out of the gas space 195 via the nonreturn valve 199 into the pressure medium accumulator 6. The pressure in the pressure medium accumulator 6 thus increases.

If the piston 197 of the compressor 108 is extended, the hydraulic machine 4 is stopped and the valve 189 switched currentlessly such that said valve is switched into the spring-preloaded position (b) thereof. In this position, the pressure medium connection A of the directional control valve 189, and therefore the pressure medium space 196, is relieved of load toward the low pressure accumulator 178, or the pressure medium space 179 thereof, which is at approximately 3 bar. As a result, the pressure prevailing in the gas space 195 can retract the piston 197 with the aid of the spring of the compressor 108. In the process, the pressure medium is forced out of the pressure medium space 196 via the pressure line 191 and the throttle 159 into the pressure medium space 179 of the low pressure accumulator 178. The throttle 159 here restricts the retraction speed of the piston 197. At the same time, gas flows out of the third working space 30; 30' via the nonreturn valve 198 into the gas space 195 of the compressor 108. The pressure in the third working space 30; 30' thereby decreases.

If the piston 197 is retracted, the directional control valve 189 is energized again via the solenoid 49 and the hydraulic motor 4 is started, and therefore the operation just described can be repeated. This operation is continued until the gas pressure in the pressure medium accumulator 6 corresponds to the pressure required for a specified emergency moving.

During the normal working operation of the adjusting device 101, leakages from the pressure medium accumulator 6 into the third working space 30; 30' itself can scarcely be avoided with the valve seat construction shown for the directional control valve 12. Said leakage leads to compressed gas penetrating from the pressure medium accumulator 6 into the third working space 30; 30' and, as a result, the pressure in the pressure medium accumulator 6 is firstly dissipated and is secondly built up in the third working space 30; 30'. It is obvious that the gas pressure which rises in the third working space 30; 30' exerts on the piston 14; 14', via the third piston surface 36; 36', an adjusting force which acts in the direction of the stop 28 and impairs a resetting of the piston 14; 14' and therefore the function of the adjusting cylinder 2; 2'. In addition, a lowering of the gas pressure in the pressure medium accumulator 6 is undesirable for safety reasons. It is therefore necessary to compensate for said leakages during normal operation and to maintain, or restore, the desired pressures in the third working space 30; 30' and the pressure medium accumulator 6, as is explained below.

As already explained, here in the working operation, the valves 12, 175, 177 and 174 are energized and have the electromagnetically actuated switching positions thereof. The valve 189 is currentless. In this operating mode, the position of the piston 14; 14' is controlled via the conveying of pressure medium by the hydraulic machine 4. In the process, depending on the direction of the load, either the first working space 22; 22' or the second working space 24; 24' is acted upon with a pressure which substantially corresponds to the external load acting on the rotor blade (not illustrated). Said pressure acts on the connection P of the directional control valve 189 via the shuttle valve 192.

If the directional control valve 189 is then energized and takes up the flow position (a) thereof, pressure medium passes via the pressure line 194 into the pressure medium space 196 such that the piston 197 extends and the previously described charging operation of the pressure medium accumulator 6 begins. The pressure medium conveyed to the pressure medium space 196 is removed here from one of the working spaces 22, 24, or 22', 24' of the adjusting cylinder 2; 2', and therefore the latter would leave the regulating position thereof. Since such an influence of the charging operation of the pressure medium accumulator 6 on the regulating position of the piston 14; 14' is undesirable, the hydraulic machine 4 is adjusted in such a manner that the rotational speed thereof is increased and therefore the regulating position of the piston 14; 14' can be maintained. The pressure medium additionally required because of the increase in rotational speed flows to the suction side of the hydraulic machine 4 from the pressure medium space 179 of the low pressure accumulator 178. In order to limit the increase in rotational speed, the pressure medium volumetric flow flowing to the pressure medium space 196 of the compressor 108 is restricted via the throttle 158.

If the piston 197 is extended, no further pressure medium is required in the pressure medium space 196 and the rotational speed of the hydraulic machine 4 is adjusted downward to the starting value thereof. The directional control valve 189 is subsequently switched currentlessly such that said directional control valve has the spring-prestressed switching position (b) thereof, and the piston 197 retracts, as previously described, and therefore pressure medium is forced out of the pressure medium space 196 into the pressure medium space 179 of the low pressure accumulator 178. In the process, compressed gas is sucked out of the third working space 30; 30' via the nonreturn valve 198 into the gas space 195 of the compressor 108. This operation is repeated until the starting position is restored, or the pressure in the third working space 30; 30' is correspondingly lowered and the pressure in the pressure medium accumulator 6 is correspondingly increased.

The second exemplary embodiment according to FIG. 2 furthermore shows a load holding function. If, for example, the piston 14; 14' which is under an external load does not change the position thereof over a given period of time, then it is energetically unfavorable to adjust said position via the hydraulic machine 4. Instead, it is more favorable to block the piston 14; 14' and to switch off the hydraulic machine 4. For this purpose, the directional control valve 177 is energized and the directional control valves 174, 175 are unenergized. In addition, the electric motor 5 is unenergized. In this manner, the first working space 22; 22' is separated from the second working space 24; 24' in a substantially leakage-free manner and the piston 14; 14' can no longer be moved.

Figure 3:
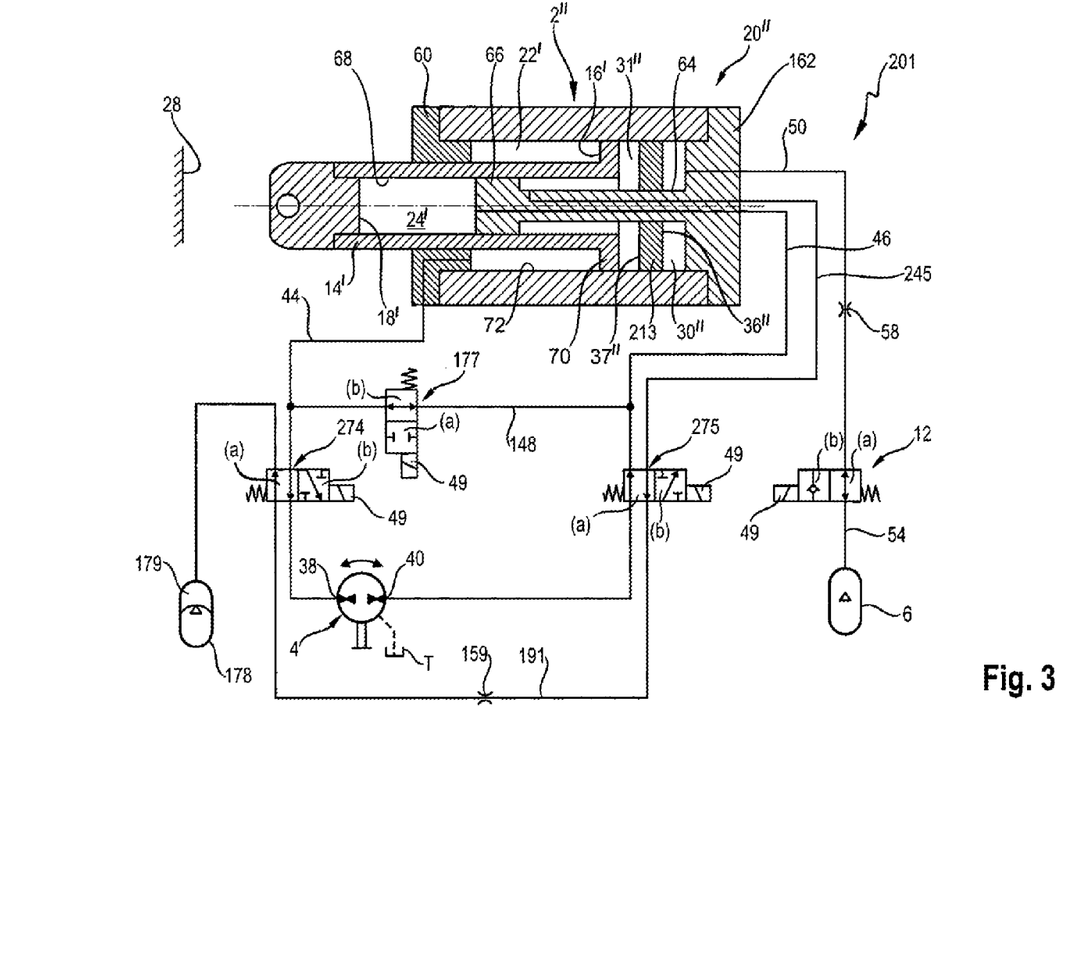
FIG. 3 shows a circuit diagram of a third exemplary embodiment of a hydraulic adjusting device with an adjusting cylinder having an integrated compressor.

FIG. 3 shows an exemplary embodiment, which is of particularly compact design in terms of apparatus, of an adjusting device 201 with an adjusting cylinder 2", which differs from the adjusting cylinder 2' according to FIGS. 1 and 2 and has a cylinder housing 20" with an integrated compressor function. For components which are of structurally identical configuration to previously described parts of the previous exemplary embodiments, the same reference numbers which have already been produced are provided below. The adjusting device 201 has the hydraulic machine 4, the first or second pressure medium connection 38, 40 of which is connectable to the first or second working space 22', 24' via the pressure line 44 or 46. Analogously to the second exemplary embodiment according to FIG. 2, the adjusting device 201 has the bypass valve 177 and the bypass line 148 in an identical design and functionality. Furthermore, the pressure medium accumulator 6, the pressure line 54, the directional control valve 12, the throttle 58 and the pressure line 50 are designed in the same design and functionality as in the two preceding exemplary embodiments. The low pressure accumulator 178, which is required for the compressor function, and the pressure medium line 191 also substantially correspond to the exemplary embodiment according to FIG. 2.

In a departure from the concentrically configured adjusting cylinder 2' presented as an alternative to the synchronous cylinder 2 in FIGS. 1 and 2, the adjusting cylinder 2" according to FIG. 3 has an additional auxiliary piston 213 which is mounted in an axially displaceable manner on the pin 64. A third piston surface 36", via which a third working space 30" of the adjusting cylinder 2" is delimited, is formed on the right-hand side of the auxiliary piston in FIG. 3. The third working space 30" is delimited radially via the inner lateral surface 72 and, on the right in FIG. 3, via an inner end surface of the cylinder base 162. A fourth piston surface 37" is formed on the auxiliary piston 213, on the left in FIG. 3, wherein a fourth working space 31" is delimited via said fourth piston surface, the inner lateral surface 72, the outer lateral surface and the annular end surface of the pin 64 and the inner lateral surface 68 and the end surface, which is on the right in FIG. 3, of the piston 14'. Analogously to the previously described exemplary embodiments, compressed gas is arranged in the third working space 30" and as in the first two working spaces 22', 24', incompressible working medium is arranged in the fourth working space 31".

For the pressure medium supply of the fourth working space 31", the pin 64 has an approximately coaxial pressure medium channel which is connected to a pressure line 245 and is adjoined by a radial bore which leads in the vicinity of the right annular end surface of the radial expanded portion 66 of the pin 64 into an annular-space-shaped section of the fourth working space 31". Via the pressure line 245, the fourth working space 31" is connectable either to the pressure medium line 191, which leads to the low pressure accumulator 178, or to the second pressure medium connection 40 of the hydraulic machine 4, as a function of the switching positions of the directional control valve 275.

During normal working operation of the adjusting device 201, the valves 274, 275 are unenergized. In this state, said valves have the switching positions (a) thereof, and therefore, firstly, the pressure medium space 179 of the low pressure accumulator 178 is connected via the pressure medium lines 191 and 245 to the fourth working space 31" and, secondly, the first working space 22' is connected via the pressure line 44 and the directional control valve 274 to the first pressure medium connection 38 of the hydraulic machine and, in addition, the second pressure medium connection 40 of the hydraulic machine 4 is connected via the valve 275 and the pressure line 46 to the second working space 24'. The valve 12 and the bypass valve 177 is energized, and therefore it has the blocking positions (b) or (a). The pressure medium accumulator 6 is thereby separated from the third working space 30" and the bypass line 148 is shut off. In this state, the hydraulic machine 4, as a function of the running direction thereof, or the direction of travel required for the adjusting cylinder 2", conveys pressure medium between the first and the second working space 22', 24' such that the piston 14' is correspondingly moved. Pressure medium from the fourth working space 31" is displaced into the pressure medium space 179 of the low pressure accumulator 178, or is conversely brought out of the pressure medium space 179 into the fourth working space 31", as a function of the direction of movement. During the normal working operation, the auxiliary piston 213 does not have any influence on the movement of the piston 14' apart from a small amount of compressibility of the compressed gas in the third working space 30".

In a first variant of a special or emergency moving operation, all of the valves 12, 275, 177 and 274 are unenergized. Consequently, the pressure medium accumulator 6 is discharged via the directional control valve 12 and the flow position (a) thereof into the third working space 30" and pushes the auxiliary piston 213 from the right to the left in FIG. 3. In the process, working pressure medium is forced out of the fourth working space 31" via the switching positions (a) of the directional control valves 275, 274 into the pressure medium space 179 of the low pressure accumulator 178 until the auxiliary piston 213 has struck against the piston 14'. The auxiliary piston 213 under continuous pressure of the pressure medium accumulator 6 then pushes the piston 14' to the left in FIG. 3 as far as the stop 28. During this displacement, working pressure medium is forced out of the first working space 22' via the open bypass valve 177 into the second working space 24'.

In a second variant of a special or emergency moving operation, only the valves 12, 275 and 177 are unenergized and have the flow positions thereof that are associated therewith. By contrast, the valve 274 is energized. The result is that a pressure medium path from the fourth working space 31" toward the low pressure accumulator 178 is shut off and it is not possible for the auxiliary piston 213 to force pressure medium out of the fourth working space 31". The volume thereof is therefore fixed. Analogously to the first variant, the pressure medium accumulator 6 is discharged via the flow position (a) of the valve 12 into the third working space 30", and the auxiliary piston 213 moves from the right to the left in FIG. 3. Since the fourth working space 31" contains incompressible working pressure medium, the auxiliary piston 213 is coupled hydraulically via the latter to the piston 14'. Differently from in the first variant, the auxiliary piston 213 no longer has to strike against the piston 14' in order to displace the latter; instead, the piston 14' moves substantially synchronously with the auxiliary piston 213. The auxiliary piston 213 under continuous pressure of the pressure medium accumulator 6 then pushes the piston 14' to the left in FIG. 3 as far as the stop 28. During this displacement, working pressure medium is forced out of the first working space 22' via the open bypass valve 177 into the second working space 24'. A volumetric flow of pressure medium out of the low pressure accumulator via the valve 274 (switching position (b)), the hydraulic machine 4 and the pressure line 46 toward the second working space 24' is negligibly small here.

In comparison to the first variant of the emergency moving operation, the second variant has the advantage that an emergency movement of the piston 14' in the direction of the stop 28 takes place immediately without the auxiliary piston 213 first of all having to strike against the piston 14'. Associated therewith is the fact that the pressure medium accumulator 6 has to emptied less by the same amount of compressed gas which is required for moving the auxiliary piston 213 as far as the contact therewith with the piston 14'. This advantage is all the greater, the greater the distance is between the two pistons 14' and 213 during the normal working operation.

Irrespective of the selected variant of special operation or emergency moving operation, the pressure medium accumulator 6 is charged via the compressor function, which is integrated into the adjusting cylinder 2", of the auxiliary piston 213 to the specified emergency moving pressure of approximately 160 bar again as follows: the valves 275, 177 and 274 are energized. The hydraulic machine 4 conveys working pressure medium out of the low pressure accumulator 178 via the switching positions (b) of the valves 274 and 275 and the pressure line 245 into the fourth working space 31" of the adjusting cylinder 2". As a result, the auxiliary piston 213 is displaced and forces compressed gas out of the third working space 30" via the energized valve 12, which has the nonreturn switching position (b), into the pressure medium accumulator 6. During this charging, the piston 14' can be fixed with the solenoid 49 of the bypass valve 177 and a blocking position (a) thereof being energized.

Additional components for pressure protection, for example a pressure limiting valve, and replenishing valve, which are known from the prior art are partly not illustrated in the circuit diagrams of the exemplary embodiments.

A hydraulic adjusting device is disclosed, in particular for use in a power installation, in particular a wind power installation, the adjusting device having an adjusting function for a working operation and for a special operation. A double-acting adjusting cylinder provided for this purpose can be acted upon for this with a working pressure medium and, for carrying out the adjusting function in the special operation, is connectable to a pressure medium accumulator which has compressed gas separated from the working pressure medium. The adjusting cylinder here has a working space which is provided in particular for the adjusting function of the special operation and the piston surface of which is coupled to a piston arrangement, which is provided in particular for the working operation, of the adjusting cylinder or is couplable to said piston arrangement.

LIST OF REFERENCE NUMBERS

1; 101; 201 Adjusting device
2; 2'; 2" Adjusting cylinder
4 Hydraulic machine
6 Pressure medium accumulator
8; 108 Compressor
10 Bypass valve
12 2/2-port directional control valve
14; 14' Piston
16; 16' First piston surface
18; 18' Second piston surface
20; 20'; 20" Cylinder housing
22; 22' First working space
24; 24' Second working space
26 Piston rod
28 Stop
30; 30'; 30" Third working space
31" Fourth working space
32 Cylinder base
34 Piston rod
36; 36'; 36" Third piston surface
37" Fourth piston surface
83 First pressure medium connection
40 Second pressure medium connection
42 Pressure line
44 Pressure line
46 Pressure line
48; 148 Bypass line
49 Solenoid
50 Pressure line
52 Pressure line
54 Pressure line
56 Pressure line
58 Throttle
60 Housing cover
62; 162 Cylinder base
64 Pin
66 Radial expanded portion
68 Recess
70 Radial collar
72 Inner lateral surface
150 Pressure line
158 Throttle
159 Throttle
174, 175; Directional control valve
177 Directional control valve
178 Pressure medium accumulator
179 Pressure medium space
180, 182, 184 Pressure line
186, 187 Nonreturn valve
188 Pressure line
189 Directional control valve
190 Pressure line
191, 194 Pressure line
195 Gas space
196 Pressure medium space
197 Piston
198, 199 Nonreturn valve
213 Auxiliary piston
245 Pressure line
274, 275 Directional control valve

The invention claimed is:

1. A hydraulic adjusting device for use in an energy or process engineering installation, comprising:
an adjusting cylinder having a piston arrangement with two piston surfaces that are effective in opposite directions, wherein a first working space is delimited via a first of the two piston surfaces and a second working space is delimited via a second of the two piston surfaces, and wherein the two working spaces are acted upon with a working pressure medium;
a pressure medium accumulator that is connectable to the adjusting cylinder and contains a compressed gas that is separate from the working pressure medium; and
a compressor device arranged partially in the adjusting cylinder or arranged outside the adjusting cylinder,
wherein the adjusting cylinder has a third working space that is delimited via a third piston surface and is configured to be acted upon with the compressed gas, and
wherein the third piston surface is configured to be coupled to the piston arrangement.

2. The adjusting device as claimed in claim 1, wherein the third working space is configured to be acted upon with the compressed gas as a function of a control signal or a measuring signal.

3. The adjusting device as claimed in claim 1, further comprising a hydraulic machine having a first pressure medium connection and a second pressure medium connection, wherein the first working space is connectable to the first pressure medium connection and the second working space is connectable to the second pressure medium connection.

4. The adjusting device as claimed in claim 3, further comprising an electric motor operatively coupled to the hydraulic machine.

5. The adjusting device as claimed in claim 3, further comprising a bypass directional control valve that has at least one actuated position and a non-actuated position, wherein, in the non-actuated position, the bypass directional control valve connects the first working space to the second working space, bypassing the hydraulic machine.

6. The adjusting device as claimed in claim 3, wherein the compressor device is arranged partially in the adjusting cylinder and has an auxiliary piston on which the couplable third piston surface is arranged.

7. The adjusting device as claimed in claim 6, wherein a fourth piston surface that is effective in the opposite direction to the third piston surface is arranged on the auxiliary piston, wherein a fourth working space of the adjusting cylinder is delimited at least in sections via the auxiliary piston, the fourth working space being connectable to one or more of one of the pressure medium connections of the hydraulic machine and a hydraulic accumulator containing the working pressure medium.

8. The adjusting device as claimed in claim 1, further comprising a shutoff valve that has at least one actuated locking position and a non-actuated position, wherein, in the non-actuated position, the shutoff valve connects the pressure medium accumulator to the third working space.

9. The adjusting device as claimed in claim 1, wherein the first piston surface and the second piston surface are approximately identical in size.

10. The adjusting device as claimed in claim 1, wherein the first working space and the second working space are arranged in tandem in a longitudinal direction of the adjusting cylinder.

11. The adjusting device as claimed in claim 1, wherein the first piston surface and the second piston surface are arranged facing away from each other.

12. The adjusting device as claimed in claim 1, wherein the third piston surface is formed on a piston rod of the piston arrangement.

13. The adjusting device as claimed in claim 1, wherein each of the first, second, and third working spaces is delimited radially at least partially via a housing of the adjusting cylinder.

14. The adjusting device as claimed in claim 1, wherein the first working space is arranged concentrically with respect to the second working space.

* * * * *